United States Patent
Burr et al.

(10) Patent No.: US 6,510,216 B1
(45) Date of Patent: *Jan. 21, 2003

(54) INTELLIGENT NETWORK PROVISIONING SYSTEM AND METHOD

(75) Inventors: Shawna M. Burr, Colorado Springs, CO (US); Riel DuToit, Colorado Springs, CO (US); Steven S. Shuman, Monument, CO (US); Jeffrey P. VanBemden, Colorado Springs, CO (US); William Z. VanBlack, Colorado Springs, CO (US); William C. Vann, Colorado Springs, CO (US); Jhoanne J. Vinuya, Colorado Springs, CO (US); Hilmar C. Wiesner, Colorado Springs, CO (US)

(73) Assignee: MCI Communications Corporation, Washington, DC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 8 days.

(21) Appl. No.: 09/046,176

(22) Filed: Mar. 23, 1998

(51) Int. Cl.[7] .......................... H04M 3/42; H04M 15/00
(52) U.S. Cl. .......................... 379/201.12; 379/114.15; 379/114.28
(58) Field of Search .......................... 379/113, 201, 379/207

(56) References Cited

U.S. PATENT DOCUMENTS

| | | | | | |
|---|---|---|---|---|---|
| 5,590,181 | A | * | 12/1996 | Hogan et al. | 379/114 |
| 5,606,602 | A | * | 2/1997 | Johnson et al. | 379/114.01 |
| 5,802,502 | A | * | 9/1998 | Gell et al. | 379/114.1 |
| 5,867,494 | A | * | 2/1999 | Krishmaswamy et al. | 370/352 |
| 5,884,284 | A | * | 3/1999 | Peters et al. | 705/30 |
| 5,912,956 | A | * | 6/1999 | Longo et al. | 379/144 |
| 5,915,008 | A | * | 6/1999 | Dulman | 379/201 |
| 5,991,381 | A | * | 11/1999 | Bouanaka et al. | 379/115 |
| 6,181,787 | B1 | * | 1/2001 | Malik | 379/207 |
| 6,240,091 | B1 | * | 5/2001 | Ginzboorg et al. | 370/270 |
| 6,269,157 | B1 | * | 7/2001 | Coyle | 379/114.01 |

* cited by examiner

*Primary Examiner*—Ahmad F. Matar
*Assistant Examiner*—Hector Agdeppa

(57) ABSTRACT

An intelligent network provisioning system (20) has a client platform (22) with a user interface for order entry. A server platform (24) is connected to the client platform (22) by a network (26). The server platform (24) is capable of sending a query to a calling card provisioning system (28). An application server (30) upon receiving an order from the server platform (24) downloads the order to the intelligent network (32) and transmits a state change message to the server platform (24).

17 Claims, 10 Drawing Sheets

| Reqmt. | Feature | Description | Classification (mandatory/optional) |
|---|---|---|---|
| 1. | Introduction | Description of IN product. | |
| 2. | Functional Requirements | General functionality available within IN. | |
| 2.1 | Customer Information | Validation and customer key data. | Mandatory |
| 2.2 | Access Methods | Methods of originating calls. | |
| 2.2.1 | Calling Party Number (CPN) Access | Pre-subscribed local phone numbers. | Mandatory |
| 2.2.2 | Calling Card Access | Access number with use of card and PIN number. | Optional |
| 2.2.3 | Dedicated Access Lines (DALs) | Dedicated link from customer to IN switch. | Mandatory |
| 2.2.4 | Remote Access | Customer-specific toll-free number. | Mandatory |
| 2.3 | Range Privileges /Restrictions | Calling definitions and exclusions. | |
| 2.3.1 | Range | Restrictions of calling. | Mandatory |

FIG. 8

| Reqmt. | Feature | Description | Classification (mandatory/optional) |
|---|---|---|---|
| | Privileges | privileges to specific areas | |
| 2.3.2 | Range Restrictions | Exclusions of calling card calls from specific originations. | Mandatory |
| 2.4 | Dialing Plans | Call routing. | Mandatory |
| 2.4.2 | Query External Database | Query external database for routing instructions. | Optional |
| 2.5 | Overflow Routing | Alternate terminations. | Mandatory |
| 2.6 | Announcements | Specific recorded messages. | Mandatory |
| 2.7 | Administrative Functionality | Tracking of customer data. | |
| 2.7.1 | Customer Profile | Defining high level data about customer. | Mandatory |
| 2.7.2 | DAL Provisioning | Provisioning dedicated access lines. | Mandatory |
| 2.7.3 | Order Tracking | Audit trail of customer orders. | Mandatory |
| 2.8 | Miscellaneous | | |

FIG. 9

| Reqmt. | Feature | Description | Classification (mandatory/optional) |
|---|---|---|---|
| 2.8.1 | Multiple Networks | Definitions of subnetworks. | Optional |
| 2.8.2 | Reservations | Acquiring customer-specific access numbers. | Mandatory |
| 2.8.3 | Supplementary Codes | Tracking and controlling calls within the network. | Optional |
| 2.8.4 | Mass Change | Modification of large portions of customer data. | Optional |
| 2.8.5 | Point of Origin Routing | Interconnect VPN network with customer network. | Optional |
| 2.8.6 | Disconnect VPN | Removal of VPN service for a customer. | Mandatory |
| 3. | External Requirements | External data elements required for order completion. | |
| 3.1 | Reference Data | Validation data requirements. | Mandatory |
| 4. | Labels/ Descriptions | Unique customer defined label. | Optional |
| 5. | Security | Controlled access to/within VPN. | Mandatory |
| 6. | Bulletin Board | User community network/application bulletins. | Optional |

FIG. 10

INTELLIGENT NETWORK PROVISIONING SYSTEM AND METHOD

FIELD OF THE INVENTION

The present invention relates generally to the field of telecommunications and more particularly to an intelligent network provisioning system.

BACKGROUND OF THE INVENTION

The intelligent network includes a number of intelligent switches (service switching points) that are used to setup voice, data, and wireless connections. The intelligent switches are connected together by carrier lines (wireless or wired/cabled). The intelligent switches are connected to a service control point (SCP) by a network. The SCP provides billing, routing, and other specialized services. An intelligent switch sends a query to the SCP when it is unable to process a call request. For instance, when an intelligent switch receives an "800" number call, the intelligent switch has to send a query to the SCP to receive routing information. An "800" number can be terminated to any line and is often terminated to different lines depending on the day of the week. The SCP matches the "800" number to the correct destination number and sends a response back to the intelligent switch to route the call to the correct destination.

All these features have to be programmed into the intelligent network. Presently a mainframe computer program is used to program the intelligent network. The mainframe computer environment is inflexible, difficult to maintain and expensive to operate.

Thus there exists a need for an intelligent network provisioning system that is flexible, easy to maintain and inexpensive to operate.

SUMMARY OF THE INVENTION

An intelligent network provisioning system that overcomes these and other problems has a client platform with a user interface for order entry. A server platform is connected to the client platform by a network. The server platform is capable of sending a query to a calling card provisioning system. An application server upon receiving an order from the server platform downloads the order to the intelligent network and transmits a state change message to the server platform.

The intelligent network provisioning system is based on a client server architecture with a graphical user interface. This makes the system flexible, easy to maintain and operate and less expensive to operate.

BRIEF DESCRIPTION OF THE INVENTION

FIGS. 8–10 are charts describing aspects of various features that are configurable by the order entry system.

DETAILED DESCRIPTION OF THE DRAWINGS

Figure 1:
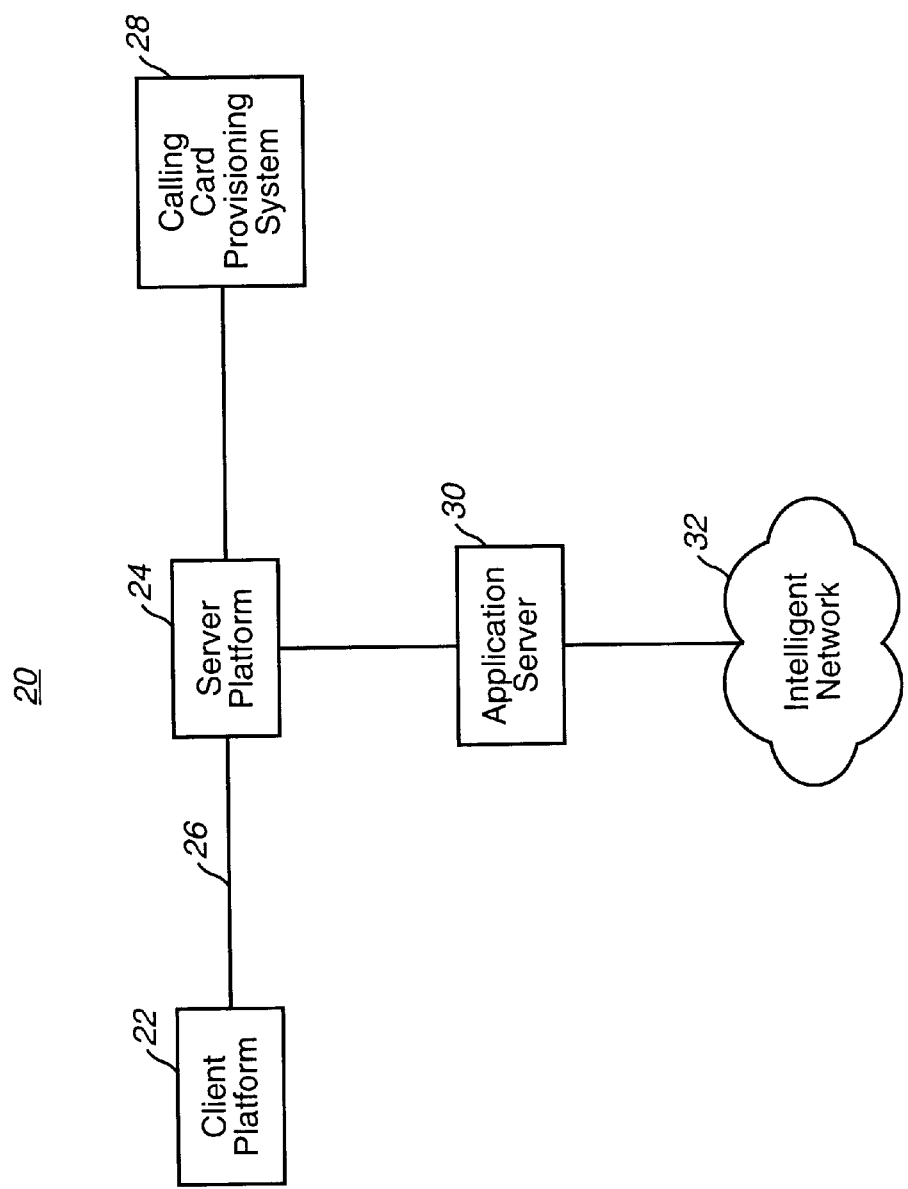
FIG. 1 is a block diagram of an intelligent network provisioning system in accordance with one embodiment of the invention.

FIG. 1 is a block diagram of an intelligent network provisioning system 20 in accordance with one embodiment of the invention. The intelligent network provisioning system 20 has a client platform 22 with a user interface for order entry. A server platform (intelligent network provisioning system server) 24 is connected to the client platform by a network 26. The server platform 24 is capable of sending a query to a calling card provisioning system 28. An application server 30 receives an order from the server platform. The application server 30 then downloads the order to the intelligent network 32 and transmits a state change message to the server platform 24. In one embodiment the application server 30 does not generate a state change message until a validation message (order implemented message) is received from a service control point (SCP) in the intelligent network 32.

Figure 2:
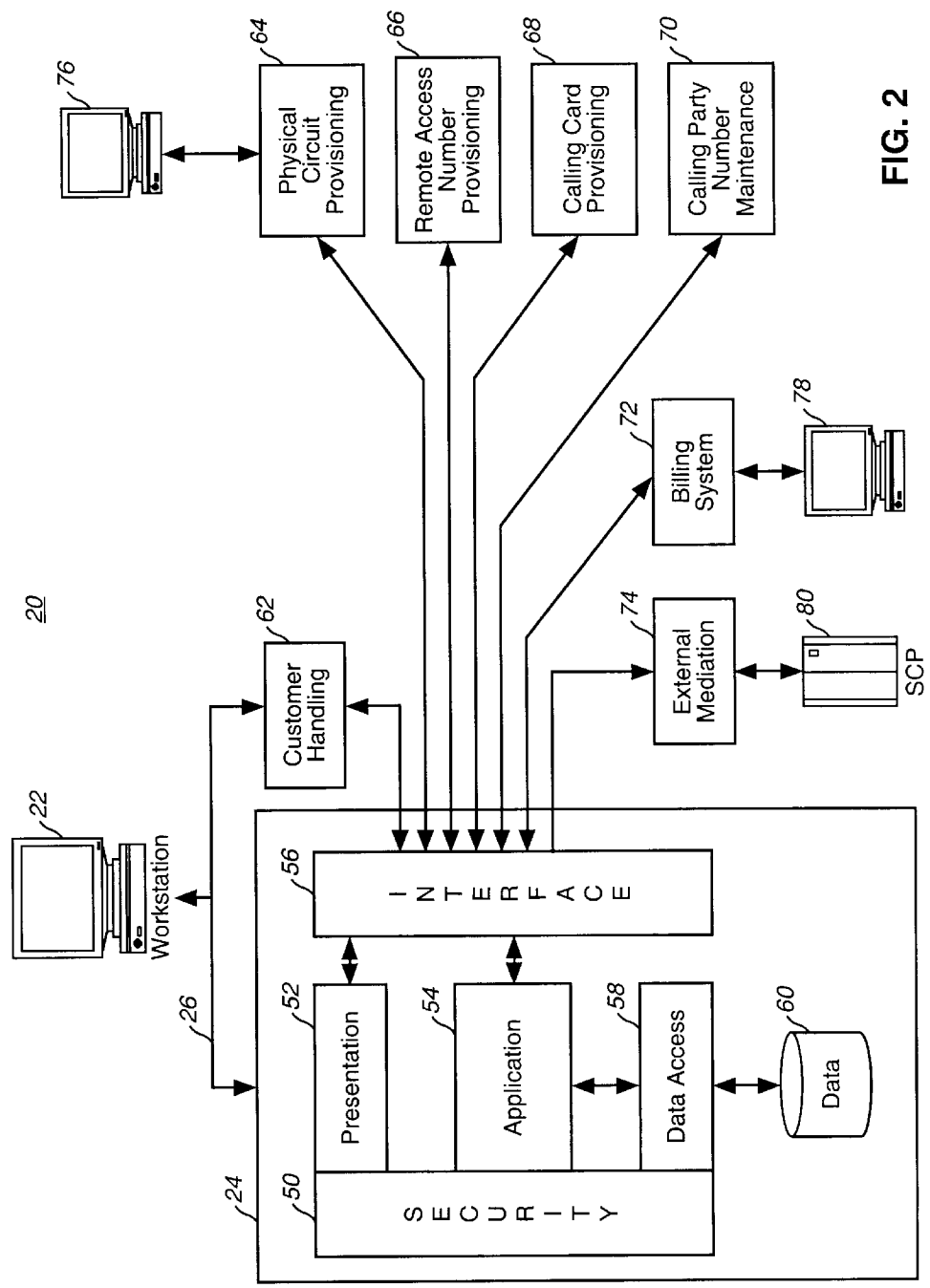
FIG. 2 is a block diagram of an intelligent network provisioning system in accordance with one embodiment of the invention.

FIG. 2 is a block diagram of an intelligent network provisioning system 20 in accordance with one embodiment of the invention. A workstation 22 is connected by a network 26 to a server platform 24. While only one workstation 22 is shown, several workstations can be connected to the network 26. The server 24 has a security layer 50 that prevents unauthorized access to the order entry system and to customer records. A presentation layer 52 is responsible for the graphical user interface screen presentation of the order entry and query system. In one embodiment the presentation layer uses a service browser to access information and enter orders. The presentation layer 52 will also perform validation of data formats and completeness of data for orders. The presentation layer 52 communicates with an application layer 54 through the interface layer 56. The application layer 54 holds the various applications (intelligent network provisioning application) and performs all business rule validation. Business rule validation includes preventing Day of Week routing instructions to be sent to the SCP without confirming that all of the days of the week have routing instructions. Another example is to ensure that the Day of Week routing instructions have valid terminations. The application layer 54 communicates with the data access layer 58 through the interface 56. The data access layer 58 is the gateway to the database management system 60. The data access layer 58 translates messages from the application layer 54 into proper queries to the database 60.

The workstation 22 is also connected to the customer handling system 62 by the network 26. The customer handling system maintains customer data such as the customer's billing hierarchy (i.e., customer's name and address, and products and services ordered). The customer handling system 62 is also connected to the interface 56. The server platform 24 is connected through the interface 56 to several external systems, such as the physical circuit provisioning system 64, the remote access number provisioning system 66, the calling card provisioning system 68, the calling party number maintenance system 70, the billing system 72 and an external mediation system 74. The physical circuit provisioning system 64 is also connected to a workstation 76. The billing system 72 is also connected to a workstation 78. The external mediation 74 is connected to a service control point 80. The mediation system (mediation function) 74 translates the instructions from the server 24 to the correct format for various vendor types of service control points (SCP) 80. This allows the intelligent network provisioning system to work with a variety of different vendors of SCPs.

Figure 3:
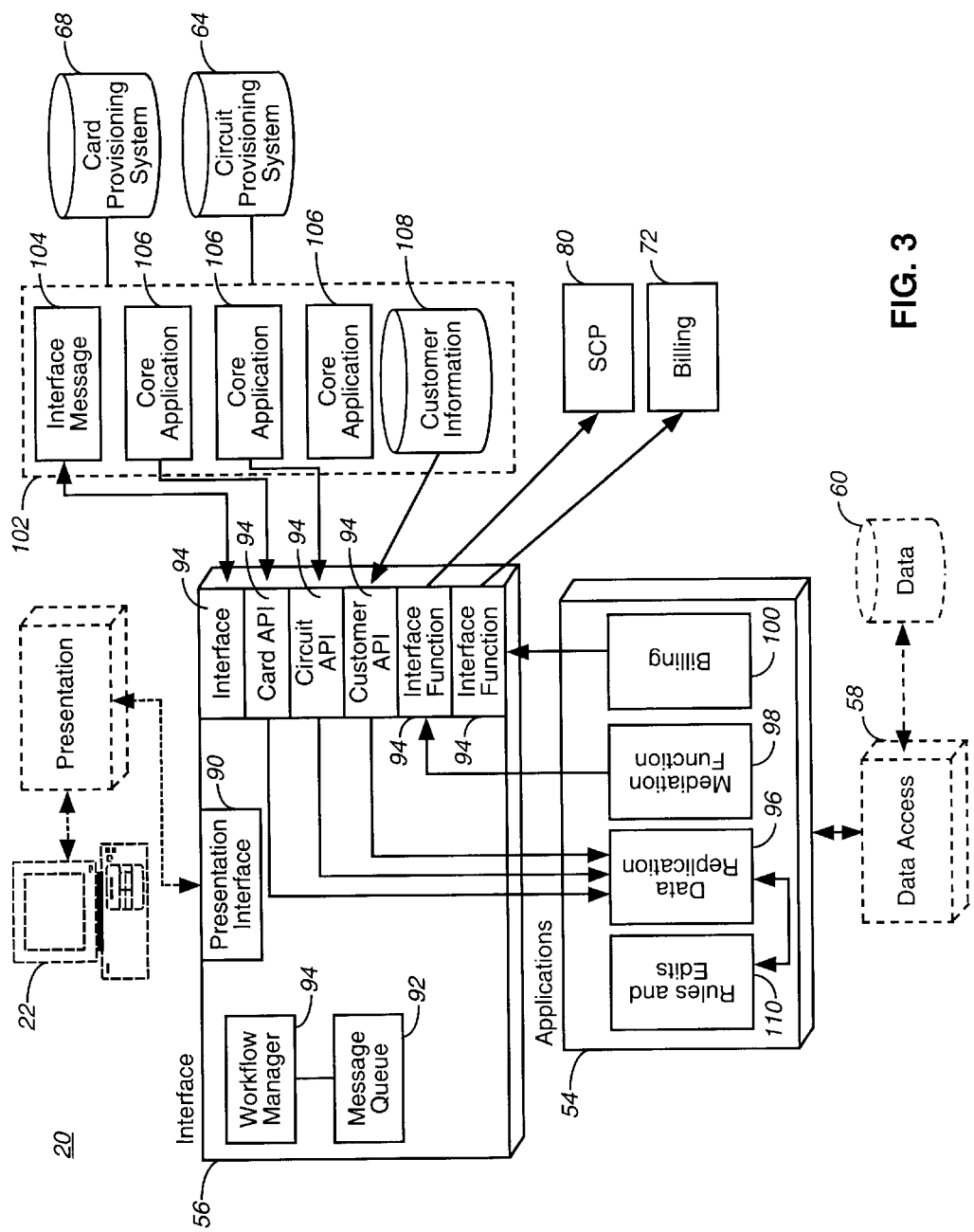
FIG. 3 is a block diagram of an intelligent network provisioning system in accordance with one embodiment of the invention.

FIG. 3 is a block diagram of an intelligent network provisioning system 20 in accordance with one embodiment of the invention. A personal computer 22 runs a presentation application 52 that is connected to a presentation interface 90 of the interface 56. The presentation application 52 generates messages that are placed in the message queue 92. The workflow manager 94 polls the message queue 92 and forwards the request to the appropriate application. Responses from the applications are similarly placed in the message queue 92 for processing by the workflow manager 94. For each of the external systems an application programming interface (API) 94 provides an interface between various external systems and applications 96, 98, 100. The external functions can be stand alone systems such as billing 72, SCP 80 or an intermediate system 102. The intermediate system 102 in this case has an interface message layer 104, a variety of core applications 106 and customer information 108. The core applications 106 connect to various stand alone systems such as a calling card provisioning system 68 and a circuit provisioning system 64. The intelligent network provisioning system 20 is designed to replicate some of the information on the various stand alone systems 64, 68, 72 and 80 in the data base 60. The data base 60 is connected to the applications through the data access layer 58. The rules and edits application 110 contains all of the business rules which edit and verify the routing plans before they are sent to the SCP.

Figure 4:
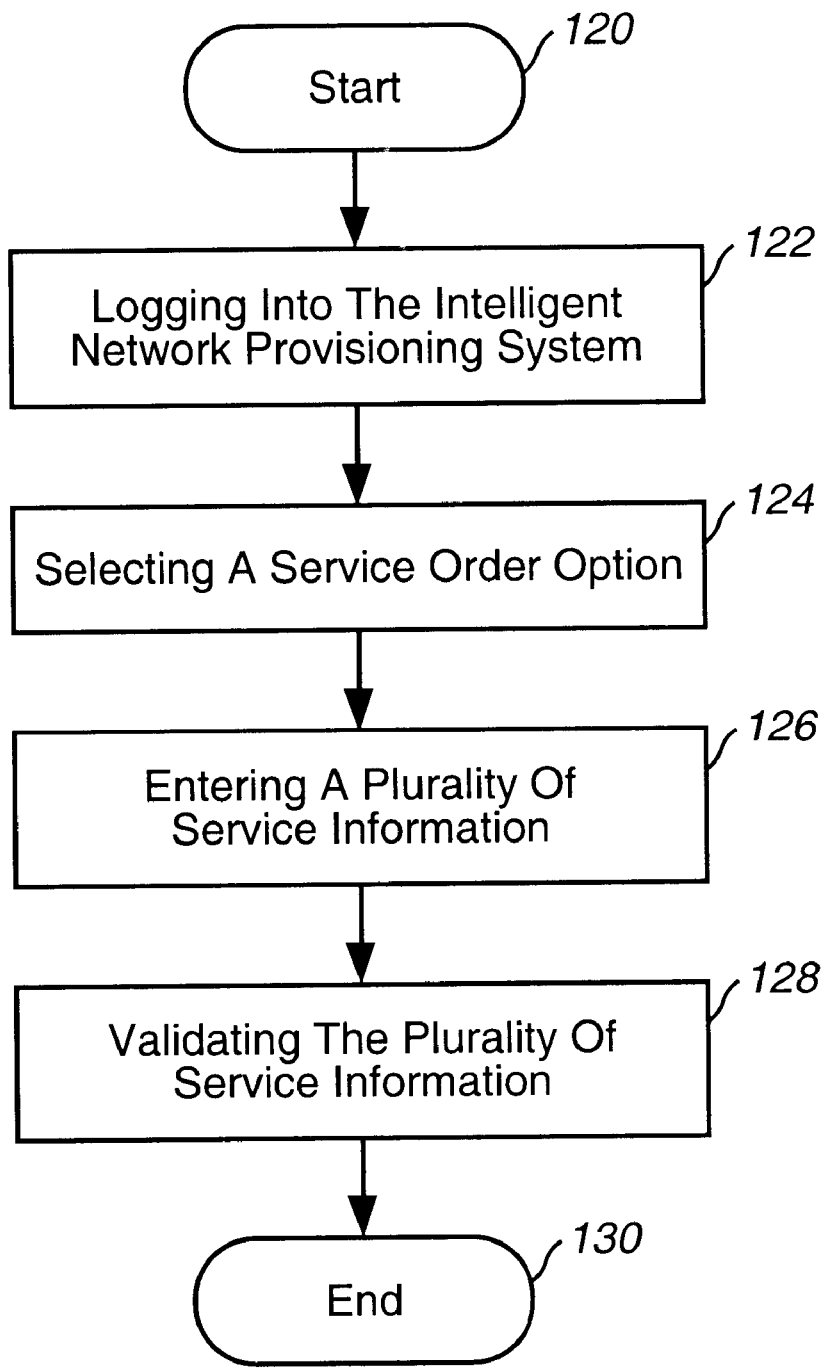
FIG. 4 is a flow chart of a process of operating an intelligent network provisioning system in accordance with one embodiment of the invention.

FIG. 4 is a flow chart of a process of operating an intelligent network provisioning system in accordance with one embodiment of the invention. The process starts, step 120, by logging into the intelligent network provisioning system at step 122. A service order option is selected at step 124. A plurality of service information is then entered at step 126. The plurality of service information is validated at step 128, which ends the process at step 130.

In one embodiment a state change message is transmitted to the provisioning system when the order has been validated and implemented. This ensures that the changes have been incorporated into the network.

Figure 5:
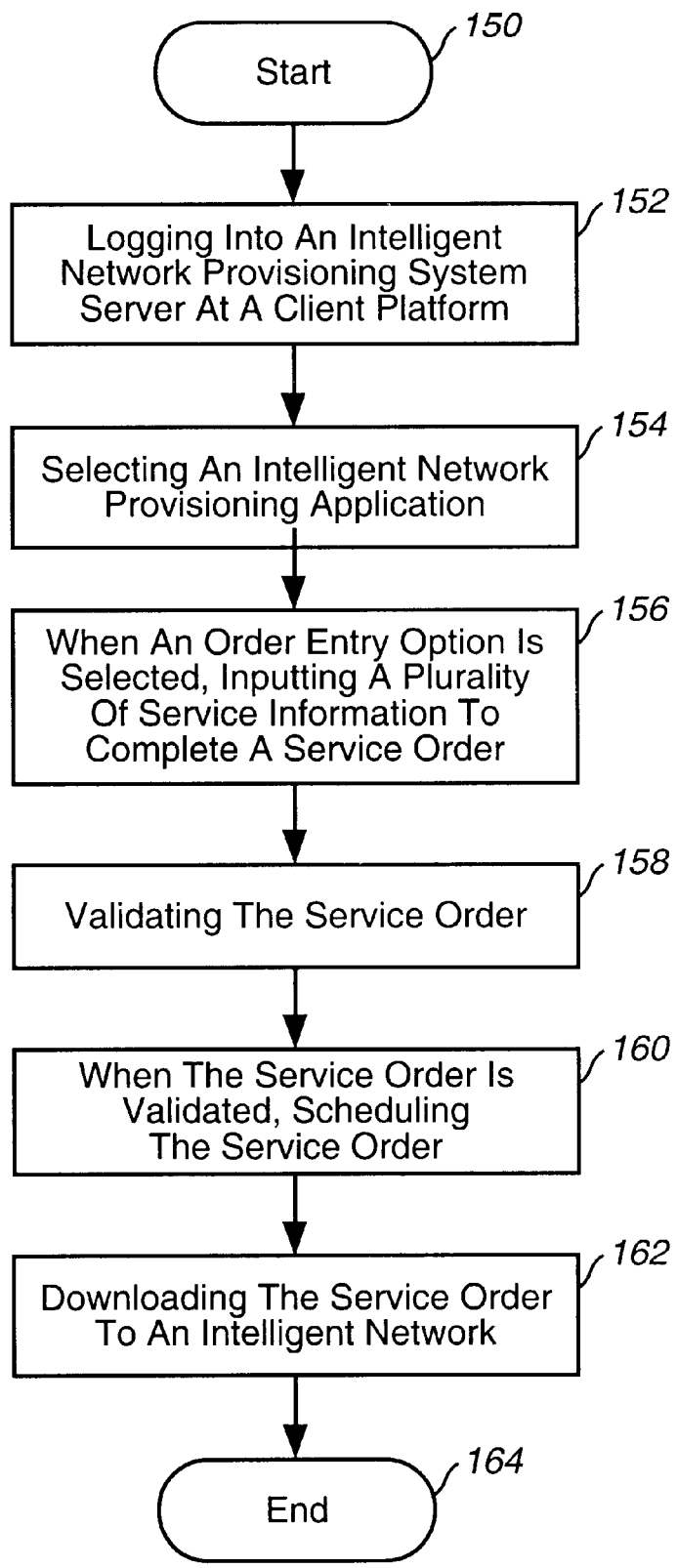
FIG. 5 is a flow chart of a process of operating an intelligent network provisioning system in accordance with one embodiment of the invention.

FIG. 5 is a flow chart of a process of operating an intelligent network provisioning system in accordance with one embodiment of the invention. The process starts, step 150, by logging into an intelligent network provisioning system server at a client platform 152. Next an intelligent network provisioning application is selected at step 154. Once the order entry option is selected, inputting a plurality of service information to complete a service order at step 156. The service order is then validated 158. Validating the order ensures that all the proper information has been entered and none of the information is contradictory. Once the service order is validated, the service order is scheduled (order scheduling) at step 160. Order scheduling allows the user to have the order take effect immediately or to take effect at some time of their choosing in the future. The service order is then downloaded to the intelligent network at step 162, which ends the process at step 164.

Figure 6:
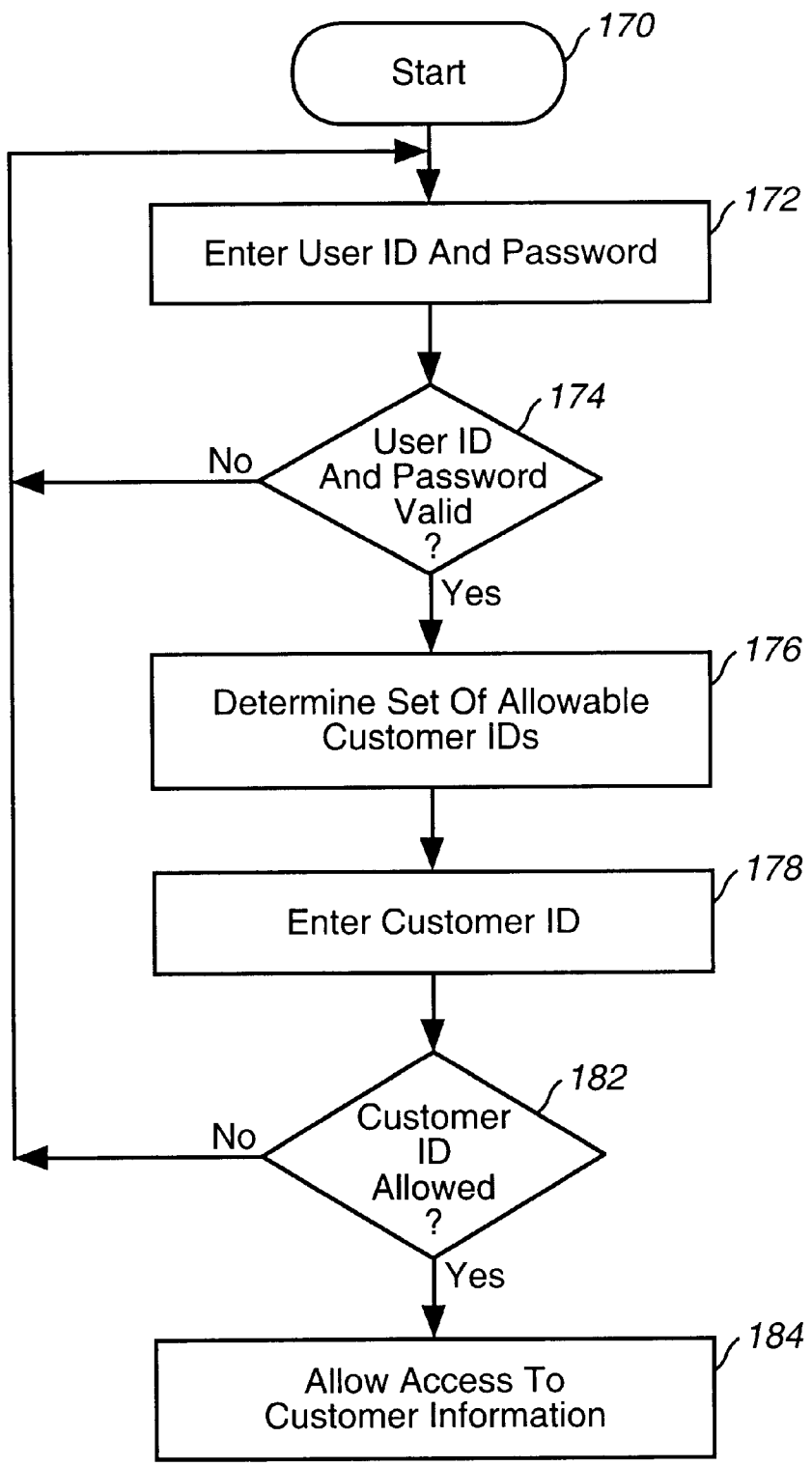
FIG. 6 is a flow chart of a security process for an intelligent network provisioning system in accordance with one embodiment of the invention.

FIG. 6 is a flow chart of a security process for an intelligent network provisioning system in accordance with one embodiment of the invention. The security process is part of logging into the system steps 122 and 152 of FIGS. 4 & 5. The process starts, step 170, by entering the user ID and their password at step 172. When the user ID and password are not valid at step 174, an error condition results and the user returns to step 172. Note that in one embodiment the person has a limited number of tries before the system will no longer accept guesses. When the user ID and password are valid at step 174, a set of allowable customer Ids are determined at step 176. A customer ID is then entered at step 178. When the entered customer ID is not allowed at step 180, the process returns to step 172. In one embodiment the process returns to step 178. When the entered customer ID is allowed at step 180, the user is allowed access to the customer information at step 184. In one embodiment, a set of valid operations is defined for each valid user ID and password. For instance, a user may only be allowed to make service inquires but not enter orders.

Figure 7:
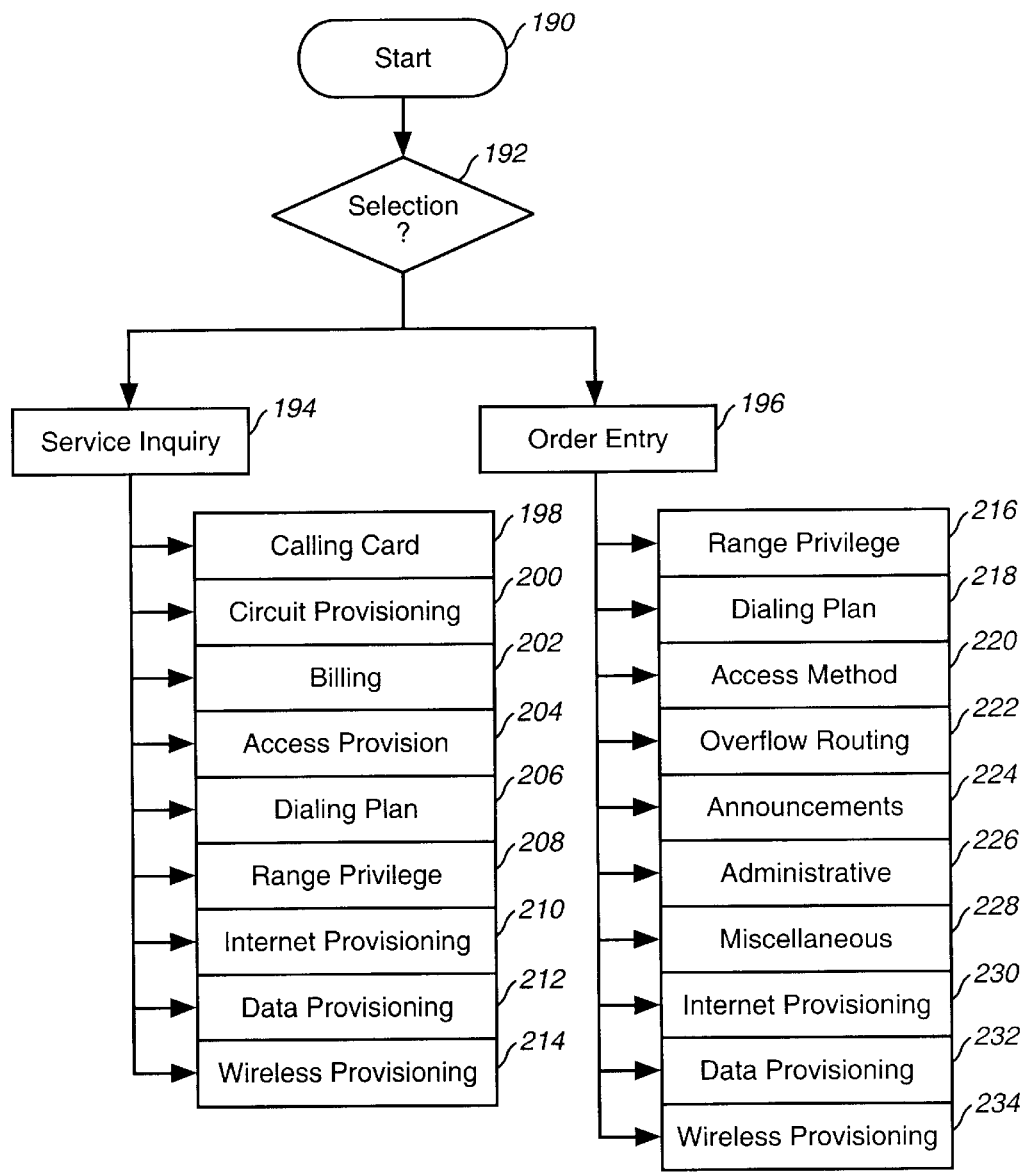
FIG. 7 is a flow chart of a presentation system for an intelligent network provisioning system in accordance with one embodiment of the invention.

FIG. 7 is a flow chart of a presentation system for an intelligent network provisioning system in accordance with one embodiment of the invention. The process starts, step 190, by selecting, step 192, either a service inquiry, step 194, or an order entry, step 196. A user can inquire about the status of calling cards 198, physical circuits 200, billing 202, access provisioning 204, dialing plans 206, range privileges 208, internet provisioning 210, data provisioning 212 and wireless provisioning (wireless communications provisioning system) 214. If a user chooses to enter an order, they can select from range privileges 216, dialing plans 218, access methods 220, overflow routing 222, announcements 224, administrative matters 226, miscellaneous matters 228, internet provisioning 230, data provisioning 232 and wireless provisioning 234. Other order entry features can be easily incorporated into this system.

Access methods 220 define the method used to originate a call into a customers' network. For instance, whether a call is allowed (restricted) to a customer's network can be based on the calling party's number. This order entry option requires that a number or range of numbers be defined that are either restricted from access or allowed access. Some of the information the user needs to enter for this option includes a customer key, a network ID, and range privileges. The user may also enter define the type of calls allowed, for instance voice, cellular and data. The validation process (validation routine) determines if all the required information has been entered for each access method and determines if any contradictions in the entered information exist.

Access methods 220 can also be determined for calling cards (calling card access system). This defines how the calling card can be used. Some of the information needed includes a personal identification number (PIN), customer key, range privileges or restrictions.

Access method 220 can be determined for dedicated access lines (DALs). Some of the information needed to define access to a DAL includes a customer service ID, customer key, range privileges and DAL type.

Range privileges (range privileges system) 216 define the allowable terminations for a given access method. Dialed numbers that do not exist within a customer's dialing plan will be screened. Range privileges can be assigned to authorization codes, calling party numbers, calling cards, direct access lines and remote access methods. One option for range privileges is universal which can be used to block all calls, allow only on-network calls, allow only on-network and domestic calls or only on-network and international calls. More detailed range privileges can be defined using the customer range privileges. Using this option privileges can be defined geographically or by number. Some of the information needed includes a range privilege ID, customer key and the range privilege definition (range category).

Dialing plans (dialing plan editor) 218 allow the customer to define call routing. Dialing plans translate dialed numbers to a termination. Some of the information needed for dialing plans are dialed number (number range), customer key, termination information, day of week, date, and time of day. This information allows a customer to have their telephone number ring at their office during the week and at home on the weekend.

Overflow routing (overflow routing system) 222 provides the ability to define alternate terminations for calls when the intended termination fails. Overflow routing requires information such as overflow table ID, customer key, hop, branch, cause values, ring no answer timer and treatments and termination information.

Announcements 224 defines announcements given if certain numbers are dialed or announcements when a call is rejected, barred or redirected. Some of the information needed for this feature are message announcement ID and customer key.

The administrative option 226 allows information about the customer to be stored, such as customer profile, DAL provisioning and order tracking. Some of the needed information is customer service ID, customer key, switch ID, and trunk group ID.

The miscellaneous option 228 allows such functions as multiple networks for a single customer, reservation of access numbers, and point of origin routing.

The internet provisioning option 230 allows the provisioning of IP (internet protocol) address, URLs (Universal Resource Locators) and allows options similar to the dialing plans, such as time of day and day of week.

The data provisioning option 232 allows the customer to determine data routing schemes and methods of transporting the data. For instance, the user can select the physical lines used to route the data or the transport method such as frame relay or Asynchronous Transmission Mode (ATM). In addition, the type of physical lines such as satellite, optical fiber or wireless can be selected.

The wireless provisioning option is used to define wireless voice or data transmissions. The wireless voice is similar to the wired voice except no fixed termination exists for mobile users. The wireless data option is similar to the data and voice provisioning options, except that the transport medium is wireless. As a result, terminations may not be a fixed location. Range privileges, announcements, etc. may be selected for wireless provisioning.

FIGS. 8–10 are charts describing aspects of various features that are configurable by the order entry system. For instance, requirement 2.2 is Access Methods. A short description of access method is given. Under access methods is calling party number access. Calling party number access is a subset of access methods. The classification defines this as a mandatory for an order related to access methods.

Thus there has been described an intelligent network provisioning system that is based on a client server architecture with a graphical user interface. The architecture is a layered approach and each layer is designed to be a plug and play component. As a result, the provisioning system is easy to update, modify and applications may be included in the overall system to tailor it for the use of the system. For example, if the system is only to provision wireless services, specific data rules may not be included in the application. This makes the system flexible, easy to maintain and operate and less expensive to operate.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An intelligent network provisioning system, comprising:
   a server platform configured to:
      receive an order from a client platform via a network, the order being associated with ordering a calling card and including allowable terminations for calls made with the calling card, and
      forward the order; and
   an application server configured to:
      receive the order from the server platform,
      download information associated with the order to the intelligent network, and
      transmit a state change message to the server platform, in response to the order being implemented in the intelligent network.

2. The intelligent network provisioning system of claim 1, wherein the client platform includes a user interface capable of order scheduling.

3. The intelligent network provisioning system of claim 1, wherein the client platform includes a user interface capable of performing service inquires.

4. The intelligent network provisioning system of claim 1, wherein the client platform includes a user interface for order entry and the order entry includes a dialing plan editor.

5. The intelligent network provisioning system of claim 4, wherein the dialing plan editor can specify a number range, a time of day, a day of week and a termination.

6. The intelligent network provisioning system of claim 1, wherein the client platform includes a user interface for order entry and the order entry includes a calling card access system.

7. The intelligent network provisioning system of claim 1, wherein the client platform includes a user interface for order entry and the order entry includes a range privileges system.

8. The intelligent network provisioning system of claim 1, wherein the client platform includes a user interface for order entry and the order entry includes an overflow routing system.

9. The intelligent network provisioning system of claim 1, wherein the server platform has a validation routine that checks the order before transmission to the application server.

10. The intelligent network provisioning system of claim 1, wherein the server platform is capable of sending a query to a physical circuit provisioning system.

11. The intelligent network provisioning system of claim 1, wherein the server platform is capable of sending a query to a billing system.

12. The intelligent network provisioning system of claim 1, wherein the server platform is capable of sending a query to a wireless communications provisioning system.

13. The intelligent network provisioning system of claim 1, wherein the server platform is capable of sending a query to a service control point.

14. The intelligent network provisioning system of claim 1, wherein the server platform includes a mediation function capable of translating a plurality of data from the order into a correct format for a service control point.

15. The intelligent network provisioning system of claim 1, wherein the application server is coupled to a service control point.

16. The intelligent network provisioning system of claim 15, wherein the service control point sends an order implemented message to the application server.

17. The intelligent network provisioning system of claim 16, wherein the application server sends the state change message to the server platform after receiving the order implemented message.

* * * * *